W. E. COPITHORN.
PNEUMATIC TIRE.
APPLICATION FILED MAR. 9, 1910.
1,121,070.
Patented Dec. 15, 1914.
2 SHEETS—SHEET 1.
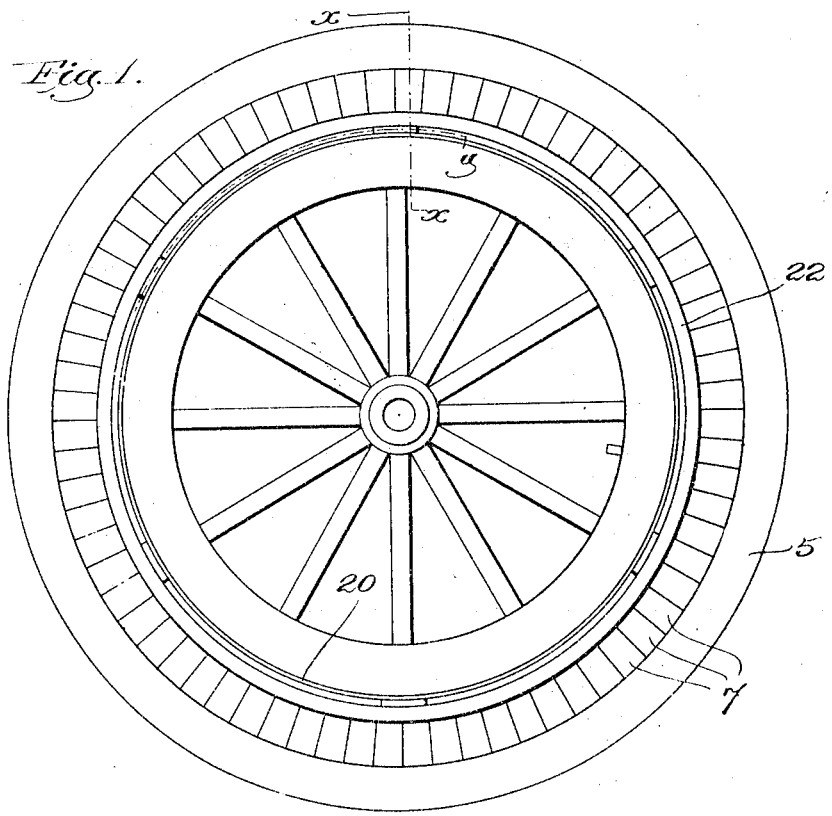
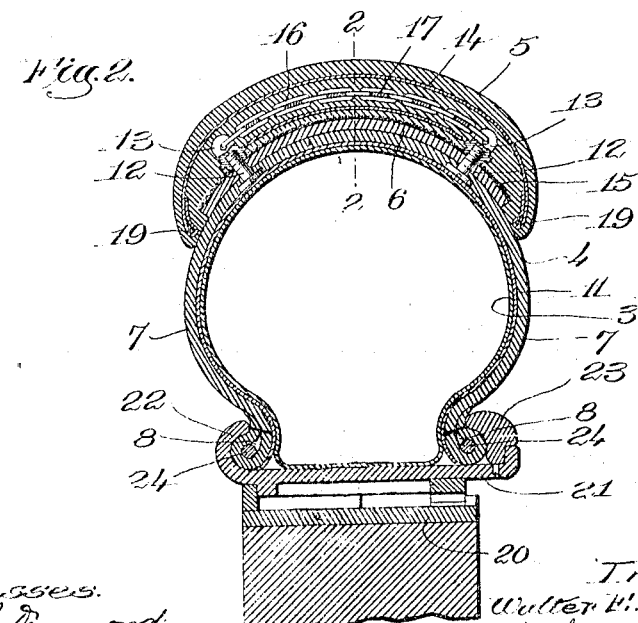

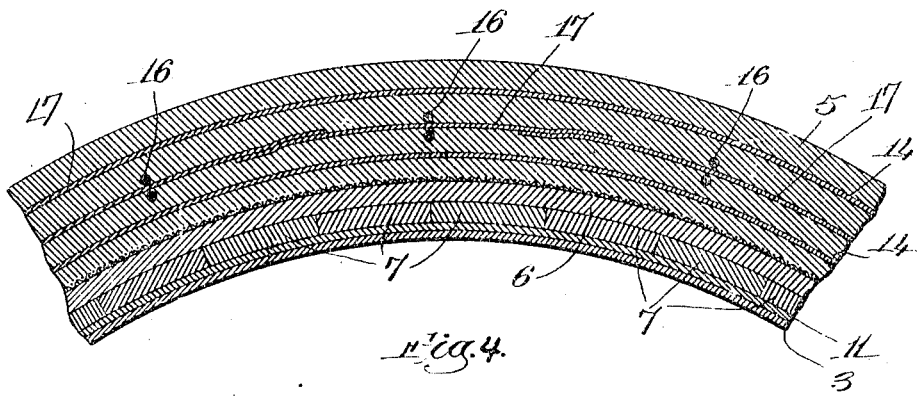
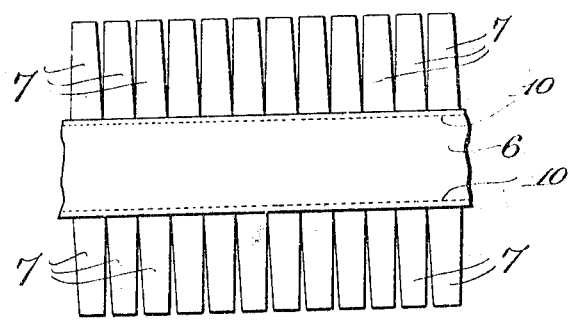

UNITED STATES PATENT OFFICE.

WALTER E. COPITHORN, OF NATICK, MASSACHUSETTS.

PNEUMATIC TIRE.

1,121,070. Specification of Letters Patent. Patented Dec. 15, 1914.

Application filed March 9, 1910. Serial No. 548,315.

*To all whom it may concern:*

Be it known that I, WALTER E. COPITHORN, a citizen of the United States, residing at Natick, county of Middlesex, and State of Massachusetts, have invented an Improvement in Pneumatic Tires, of which the following description, in connection with the accompanying drawing, is a specification, like characters on the drawing representing like parts.

This invention relates to pneumatic tires and has for its object to provide a tire with a novel detachable tread surface which is non-puncturable and which can be readily removed when it becomes worn so that a fresh unworn tread surface can be substituted therefor. In this way practically a new tire can be secured without the excessive cost involved in purchasing a new tire complete.

The features wherein my invention resides will be first described and then pointed out in the appended claims.

Referring to the drawings wherein I have illustrated a selected embodiment of my invention, Figure 1 is a side view of a wheel having my tire applied thereto; Fig. 2 is an enlarged section through the tire and a portion of the rim on the line $x$—$x$, Fig. 1; Fig. 3 is an enlarged section on substantially the line 2—2, Fig. 2; Fig. 4 is a detail view of a portion of the body of the tire.

The pneumatic tire comprises an inner tube 3 of usual construction, a body portion or casing 4 which contains the inner tube, and a tread portion 5 which is detachably connected to the body portion. The body portion 4 is of novel construction and is formed of a strip 6 of leather which extends around the tire on the tread side thereof and to which a plurality of separate cross pieces 7 are connected. When the body of the casing is first made, it will have something of the appearance shown in Fig. 4 with the pieces 7 forming separate laterally-extending wings, but when the casing is given its proper shape, the wings 7 are bent downwardly to form the sides of the tire, as shown in Figs. 1 and 2, and the end of each is bent back on itself and secured to the body thereof to form the wire-receiving loop 8. The cross pieces or wings 7 are of such a shape that when the tire is formed they will fit tightly together to make the side of the casing as seen in Figs. 1 and 2. A casing thus made has a solid tread and sectional sides. I prefer to use leather for the strip 6 and the cross pieces 7 because of its cheapness and good wearing qualities, although any suitable material might be used for these parts. The wings or cross pieces 7 may be secured to the strips 6 in a variety of ways, but will preferably be sewed thereto by stitches 10, as seen in Fig. 4. I will preferably place a lining 11 of canvas or some other similar material between the inner tube 3 and the casing because since the sides of the casing are made of independent sections 7, it will be advantageous not to have the inner tube contact directly with it. Wires 24 are inserted through the wire-receiving hooks 8, thus forming a bead on the body of the tire, which bead is held between the clamping flanges 22 and 23 of the rim 21.

The tread portion 5 of the tire is detachably secured to the body or casing so that when one tread portion has become worn, it may be removed and another one may be substituted therefor. My invention contemplates various ways in which this detachable tread portion may be made and secured to the casing. In the present embodiment, the body of the tire has secured thereto and extending therefrom at suitable intervals pairs of screws 12 and the tread section 5 has embedded therein nuts 13 which are adapted to screw onto the screws 12. The screws 12 will extend loosely through apertures formed in the sections 6 and 7 with the head of the screw on the inside of the section 7, as clearly seen in Fig. 2.

The tread section 5 can be made in any suitable way and of any suitable material. It will preferably be formed of rubber in which is embedded one or more layers of canvas 14 for giving it body and shape, and in making the tread sections the nuts 13 will be molded therein. The tread section will also preferably be provided with an inner facing 15 of some non-puncturable material, such, for instance, as very fine woven wire fabric, which when the tire is completed is interposed between the tread section and the body. I have also shown the tread section as having embedded therein chains or similar flexible connections 16 which connect the nuts 13 of each pair, and strips of canvas or similar material 17 may be placed in the links of the chains, as seen in Figs. 2 and 3. These strips are preferably comparatively short strips and the strips of the adjacent chains overlap each other, as clearly seen in Fig. 3. I have also shown wires 19 embedded in the tread section and to which the edge of one of the fabric layers 14 may be secured.

In order to apply the tread to the tire it is necessary that the casing should be removed from the rim and the inner tube 3 and lining 11 removed from the casing. When this is done, the heads of the screws 12 are accessible and the body of the casing may be placed within the tread 5, and the screws may then be entered into the nuts 13. Similarly in removing the tread the tire must be removed from the rim so as to render the screws 12 accessible.

The tread portion I have herein described is extremely strong and will withstand a great deal of wear, but when it does become worn it can be readily removed and a new one put in its place. Further the presence of the wire fabric 15 makes the tire practically non-puncturable.

The rim of the wheel may have any suitable construction. I have herein shown it as made with the section 20 which forms a permanent part of the wheel and with the demountable section 21 which may be secured to the wheel in any approved way.

Having fully described my invention, what I claim as new and desire to secure by Letters Patent is:—

1. In a pneumatic tire, the combination with an inner tube, of a shoe or casing for said inner tube comprising a body having screws extending outwardly therefrom and arranged in pairs, the screws of each pair being on opposite sides of the center, a detachable tread portion having nuts embedded therein and adapted to be engaged by said screws, chains embedded in the tread portion and connecting the nuts of each pair, and a non-puncturable lining for said tread portion.

2. In a pneumatic tire, the combination with an inner tube, of a shoe or casing inclosing the inner tube and giving support to and holding the latter in shape, said shoe or casing being formed of a strip of leather extending around the tread of the tire and comparatively narrow cross pieces secured centrally to said strip and extending beyond the same on each side thereof, the projecting portions of the cross pieces being disconnected from each other and shaped to engage each other edge to edge, each cross piece having a loop at each end, two wire rings, one threaded through the loops at each edge of the tire, said rings serving both to hold the shoe or casing in shape and to furnish edges to be gripped by a clencher rim, a detachable tread portion having nuts embedded therein, and screws anchored in the leather strip and cross pieces and engaging said nuts.

3. In a pneumatic tire, the combination with an inner tube, of a shoe or casing for said inner tube comprising a body having screws extending outwardly therefrom and arranged in pairs, a detachable tread portion separate from the body and having nuts embedded therein and adapted to be engaged by said screws, chains connecting the nuts of each pair, and strips of fabric extending through the links of the chain and embedded in the tread portion.

In testimony whereof, I have signed my name to this specification, in the presence of two subscribing witnesses.

Dr. WALTER E. COPITHORN.

Witnesses:
 Louis C. Smith,
 Thomas J. Drummond.